United States Patent [19]

Cambio

[11] 4,213,933
[45] Jul. 22, 1980

[54] METHOD OF MAKING A BLOW MOLDED CONTAINER HAVING AN INSERT MOLDED IN SITU

[75] Inventor: Orlando D. Cambio, Bristol, Wis.

[73] Assignee: Respiratory Care, Inc., Arlington Heights, Ill.

[21] Appl. No.: 886,714

[22] Filed: Mar. 15, 1978

[51] Int. Cl.$^2$ .................... B29C 17/07; B29D 3/00
[52] U.S. Cl. .................... 264/515; 264/516; 264/525; 264/536; 53/453; 53/140
[58] Field of Search ............ 264/515, 516, 524, 536, 264/525; 425/525; 53/453, 140

[56] References Cited

U.S. PATENT DOCUMENTS

| | | | |
|---|---|---|---|
| T856,041 | 11/1968 | Delaire | 264/515 X |
| 2,959,812 | 11/1960 | Allen | 264/515 X |
| 3,358,062 | 12/1967 | Lemelson | 264/515 X |
| 3,694,534 | 9/1972 | Le Troadec | 264/515 X |
| 3,919,374 | 11/1975 | Komendowski | 264/515 |

Primary Examiner—Jan H. Silbaugh
Attorney, Agent, or Firm—Eric P. Schellin

[57] ABSTRACT

There is disclosed a method and apparatus for blow molding a thermoplastic container. The blow molded container is fabricated conventionally from a downwardly descending thermoplastic extruded parison tubing which passes between sets of separated mold halves. One of the sets of mold halves is adapted to accommodate an insert positioned on a retaining wand. In another embodiment the wand is supported by means located externally of said mold halves and in some cases axially with respect to the molds.

When the molds close and the parison is conventionally blow molded the wand continues to support the insert while at the same time extends beyond the container so blow molded. The insert may be, for instance, a nozzle for a thermoplastic bottle having a cap molded thereabout having break away features whereby the cap may be removed.

20 Claims, 8 Drawing Figures

FIG. 5.
FIG. 7.
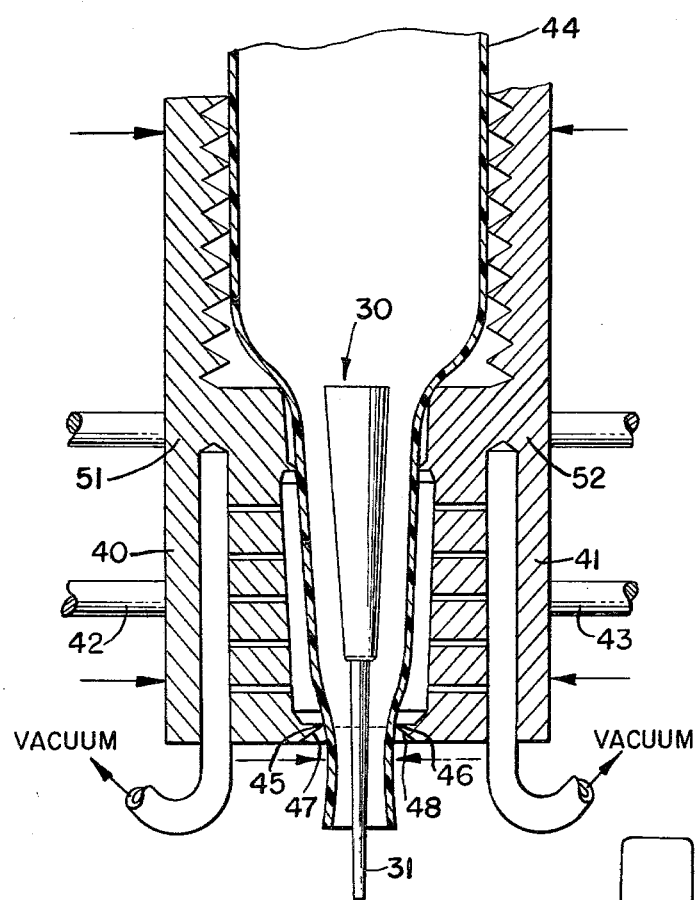
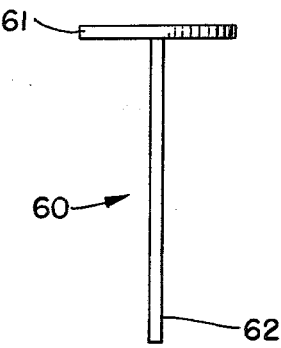
FIG. 8.
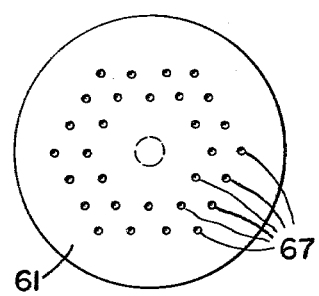
FIG. 6.
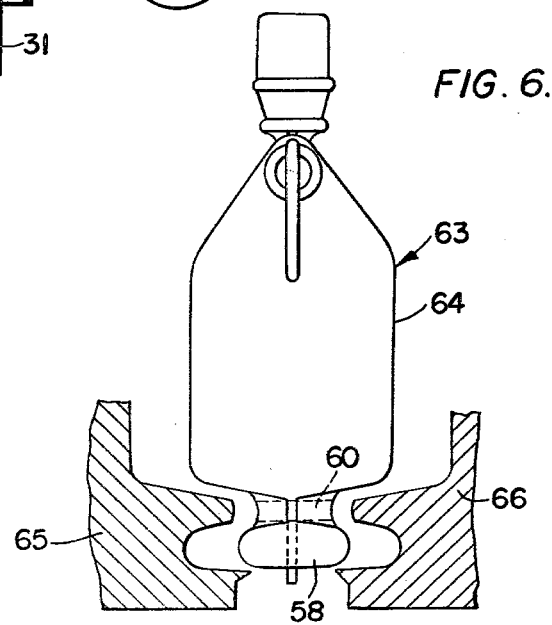

METHOD OF MAKING A BLOW MOLDED CONTAINER HAVING AN INSERT MOLDED IN SITU

BACKGROUND OF THE INVENTION

During the last two decades there has been tremendous activity with respect to the concept of blow molding thermoplastic containers from a descending extruded thermoplastic parison tubing. The thermoplastic material has most often been of either a polyethylene or polypropylene. The thermoplastic material is usually employed in the form of beads which are fed into the hopper of an extruder. Suitable heating means is provided whereby the beads are softened so that they may be driven as by screw means through a conventional die means.

Within the last decade additional innovations have been achieved whereby containers having unusual and complex configurations have been blow molded. Such blow molding operations are quite rapid and in most situations a plurality of the containers are blow molded at the same time, thereby further increasing the output.

During recent years a further development has occurred. In this development the blow molding step is accompanied by a step of filling the blow molded container, such as a bottle, with a liquid just prior to the completion of the blow molding operation. The blow molding operation is essentially concluded with the complete sealing of the bottle. Therefore, it is noted that when the bottle is charged with a liquid and sealed, the bottle must be breached or penetrated in order to obtain access thereto. Such access may be obtained by employing a penetrating cannula. On the other hand access to the interior can be obtained by employing a break away cap. The technique for providing a liquid charged blow molded container having a penetrable seal can be seen in U.S. Pat. No. 3,325,860. Considerable specialized improvement on the concept can be discerned from U.S. Pat. No. 3,807,713 wherein a bottle is disclosed having a specified use.

Of even more recent date considerable interest has been generated by the teachings found in U.S. Pat. No. 3,851,029. It has been demonstrated that in numerous circumstances there is a decided need to provide a cap over a clean sterile breachable site on a thermoplastic blow molded container. The cap may overlie a penetrable seal or it may be merely in spaced relationship with respect to a second breakaway closure member. In such an assemblage, the outer cap is removed by breaking it away from the container along an integrally molded weakened portion to reveal the second penetrable site or break away second cap. The site or the second cap has been protected by the first cap so that they are as clean and sterile as first achieved at the time of construction.

In one of the foregoing arrangements, the first cap must first be broken away before one has access to the second cap which may be removed by manually grasping the second cap and also breaking away this second cap. Ideally, it will be appreciated, would be to provide an ingenious system whereby access is provided to the contents of the container by breaking away the first cap which action would also result in providing an aperture or opening to the contents of the container through a second cap.

BRIEF DESCRIPTION OF THE INVENTION

In the above, mention was made of an ideal arrangement wherein the fact of breaking away a first cap also opens the container to access. It will be seen that the present invention teaches such an ideal. Of course, the present invention is not limited thereto as it may not be propitious to obtain immediate access to the contents of the container with the removal of a first cap, for instance.

In essence, however, the invention concerns the use and placement of an insert whereby the conventional continuously descending tubular parison of a thermoplastic engulfs the insert. The extrusion is accomplished between suitable mold halves in a conventional manner. When the extrusion has progressed to the necessary level, the mold halves are closed and the parison is subjected to gas pressure to produce a container conforming to the internal configurations of the mold. In the usual circumstances contemplated herein the insert is positioned whereby it is located in a spaced manner from the walls of the mold halves. It will be appreciated that this results in considerable engineering problems. In the present matter the problem has been solved by mounting the insert on a wand or stem. The stem is of a dimension so that it extends beyond the confines of the mold which has a suitable base through which the stem extends to a support means external of the mold. When the mold halves close in a conventional manner, not only is the excess parison cut off but also that portion of the wand or stem protruding from the bottom of the closed mold halves is suitably severed.

BRIEF DESCRIPTION OF VIEWS OF THE DRAWINGS

FIG. 5 is a partially exploded view illustrating how the closure portion of the container of FIG. 1 is blow molded from an extruded parison in the mold, with the insert in place;

FIG. 6 is a partially exploded fragmentary view of another embodiment illustrating blow molding with another type of insert.

FIG. 7 is a side view of the insert employed in the embodiment of FIG. 7;

FIG. 8 is a top plan view of the insert of FIG. 7.

DETAILED DESCRIPTION

Figure 1:
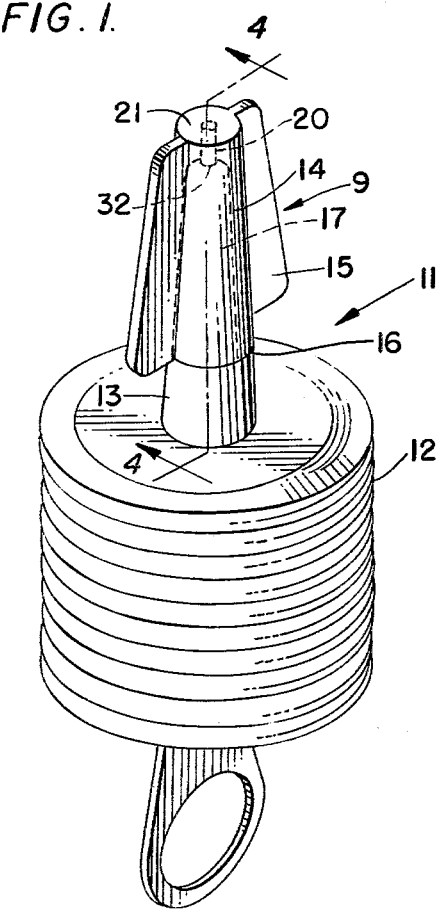
FIG. 1 is a perspective view of a preferred embodiment of the container of the present invention with a closure member.

Turning now to the preferred embodiment, attention is directed to a container 11 having a cylindrical body portion 12 with bellow like walls whereby the container 11 may be axially collapsed. One end of the container possesses a conventional axially aligned loop for the insertion of a thumb when the container is to be squeezed in a conventional manner to discharge contents therefrom. Of more importance, of course, is the other end which carries the collar 13 blow molded integrally with the top 9 of the container and the outer cap 14 which is also blow molded integrally with the entire container. The outer cap 14 is seen to have optional wings 15 to assist in breaking the cap at the juncture 16 between the collar and the outer cap 14.

Figure 4:
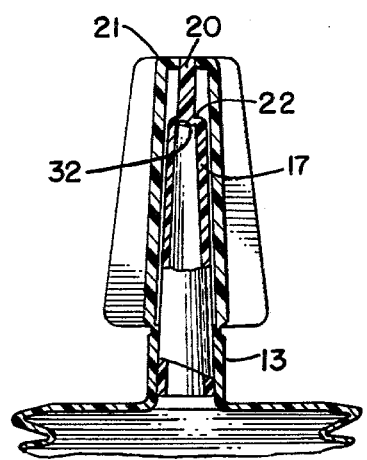
FIG. 4 is an enlarged cross sectional view of the double closure area along the plane 4—4 of FIG. 1.

Located internally of the outer cap 14 is a nozzle 17, shown by dotted lines in FIG. 1, but more clearly demonstrated is the cross section of FIG. 4. The nozzle 17 is positioned internally of the collar 13 and during the blow molding operation becomes securely adhered thereto.

It will be seen that the outer cap possesses a truncated cone configuration. At the same time the nozzle possesses a similar configuration which is conventional in the art. The internal surfaces of the outer cap are spaced from the external surfaces of the nozzle as can be seen from FIG. 1 and, especially, FIG. 4.

Of special interest to the instance matter is the fact that the nozzle 17 is connected to the outer cap by a short stub 20. The stub 20 extends downwardly axially internally from the top 21 of the outer cap to the top 22 of the nozzle 17.

Figure 2:
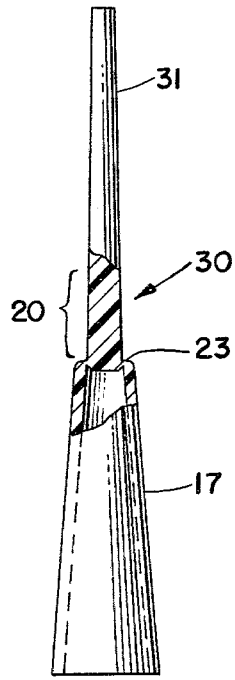
FIG. 2 is a view of the insert in partial cross-section employed in the preferred embodiment of the present invention.

Attention is now directed to FIG. 2 for a review of the insert 30 used in the preferred embodiment of the present invention. The insert has become the nozzle 17 but from the figure it will be seen to have a stem 31 a portion of which becomes the stub 20 mentioned in the foregoing. The stem and the nozzle are fabricated as by conventional injection molding. FIG. 2 is also quite useful in showing the aforementioned break off juncture 23 between the stub 20 and the nozzle 17. The juncture is simply an annular undercut portion so that the stub 20 has an end portion 32 which breaks away with the stub 20 to reveal an aperture 33 as seen from FIG. 3, for instance.

Figure 3:
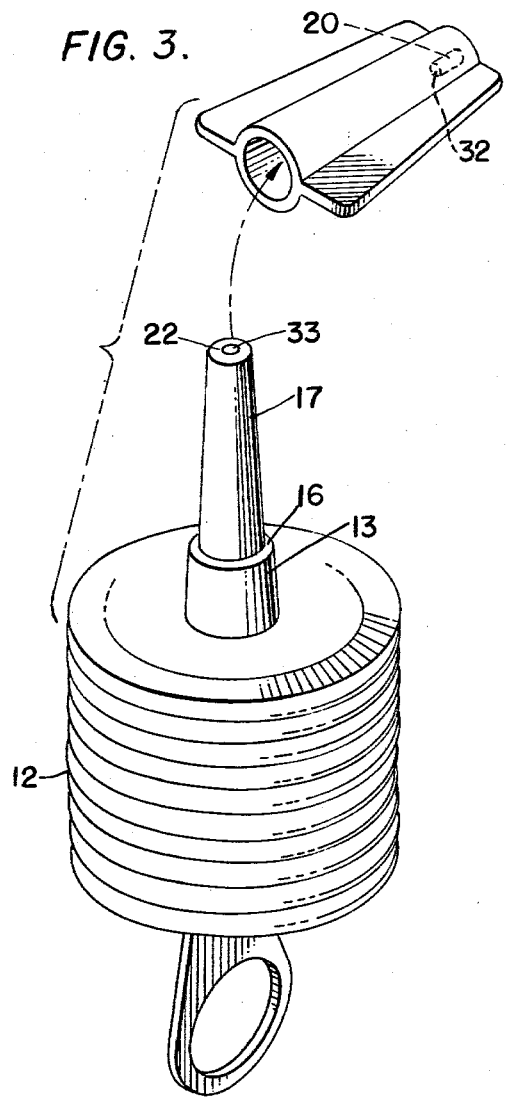
FIG. 3 is the same container with the closure member removed and exploded from the container.

Having provided detailed description of the preferred embodiment, attention is now directed to FIG. 3 for a consideration of the result as outer cap 14 is broken away from the container 11 and the upwardly extending nozzle 17. It will be seen that the outer cap has been suitably disassembled whereby the outer cap 14 is broken away from junction 16 and the stub is broken away from the nozzle to thereby reveal the opening 33 through which an operator may have access to the contents in the container.

Having considered in sufficient detail the preferred embodiment of the container of the present invention, it is now useful to consider in some detail the use of the insert in the blow molding operation. Accordingly, attention is now directed to FIG. 5. As the blow molding operation in the forming of the container is fairly conventional, only that portion pertinent to the forming of the outer cap and collar around the insert is disclosed.

The mold comprises two halves 40 and 41. They are driven together and withdrawn by push rods 42 and 43. A tubular thermoplastic parison 44 of polyethylene or polypropylene, for instance, is continually extruded downwardly in a manner whereby the parison 44 is in axial alignment with the axis of the mold halves when the mold is closed. When sufficient material has been extruded so that the parison is below the mold halves, the mold is closed. However, prior to the closing of the mold and prior to the extensive movement of the parison an insert of the type disclosed by FIG. 2 is located in a manner whereby the nozzle portion and a portion of the stem is located between the mold halves and in a position so that the downwardly descending parison envelopes the insert. The insert is supported by its stem by a suitable support means, not shown.

Such support means may comprise a block having a chuck like means which is manually loaded with the insert whereby the insert is supported at its distal end portion. On the other hand, it is comtemplated that a plurality of containers with suitable inserts will be blow molded at one time. The support means in such a situation will be a single block with a plurality of spaced chucks. Additionally, the support means may be removable so that they may be pre-loaded with inserts of the present invention remote from the blow molds and then may be either manually or mechanically brought into position in a suitable sequential operation to accommodate the blow molding operation.

When the extrusion of the parison has arrived at the position shown in FIG. 5 the mold halves are closed. The mold halves in the fragmentary portion illustrated are suitably machined to provide suitable cavities whereby the external appearance of the outer cap and collar may be achieved. The mold halves having at the bottom portion thereof cutting edge 45 and 46 and a lower chamfered portions 47 and 48 so that the excess extruded parison and the excess stem may drop away. The closing of the mold halves effectively positions and bonds the insert as noted whereby the bottom of the mold halves have now taken over the support function. During the closing of the mold halves a vacuum is created within the cap cavity before the mold is entirely closed but after the indented portions of the cavity have touched the parison. This action causes the cap to be formed before the mold closes, thereby preventing the parison from touching and sticking to the usable portion of the insert and also allowing air to enter the internal portion of the cap, during forming, before the ends are sealed off.

The vacuum is created through a series of small holes located around the periphery of the cap cavity. The holes are connected to a manifold within the mold block which is, in turn, connected to a vacuum source.

It is only necessary to form the lower portion of the container in this manner when the insert is such that it seals the junction between the upper and lower portion, when the mold closes, thus closing off any fluid pathway between the two. When the junction is not sealed such as in the case of bottle 63 the lower portion can be formed in the conventional blow molding manner.

After mold closing the tubular parison is cut loose from the extruder and the mold shifts to a secondary station. At this station a blow stick enters the open end of the tubular parison and gas is forced through the blow stick into the parison. The resulting pressurization causes the parison to expand outwardly until it conforms to the mold cavity. The upper portion and, when no junction seal exists, the lower portion are formed in this manner.

When the blow molding technique has been essentially completed, the container may be charged with a liquid through the blow stock by arrangement of suitable valving or through a second liquid charging means in juxtaposition with and relative parallel operation with the blow stick.

The embodiment shown in FIG. 1 is to a thermoplastic bottle having collapsible or bellows like cylindrical configuration. This type of container will find great usefulness as an irrigation device, for instance, although not limited to such an arrangement.

Attention is now directed to FIGS. 6–8 for another embodiment of the present invention wherein the useful portion of the insert 60 is a diffusion disc 61 integral with an upstanding stem 62. The insert is shown by dotted lines in FIG. 6 located in a constricted portion 59 of a blow molded thermoplastic bottle 63 having a liquid containing upper body portion 64 and a lower bottom portion 58. FIG. 7 depicts the use of mold halves 65 and 66 in forming the lower bottom portion and the constricted portion 59, now surrounded along the radial edge of the disc 61. The mold halves pertaining to the formation of the upper body portion 64 are shown only in fragmentary form.

The diffusion disc 61 is shown with greater particularity in FIGS. 7 and 8. Note that the disc 61 is secured to a stem 62 which in this embodiment is normal to the plane of the disc and axially disposed with respect to the disc. The insert may be constructed as by injection molding. A plurality of small bores 67 are located in the disc 61 through which a gas may pass.

The bottle, when filled and ready for use in accordance with the precepts discussed in the aforementioned U.S. Pat. No. 3,807,713, has a gas under pressure distributed into the lower bottom portion as described in the said patent. Gas bubbles are formed therein which because they are lighter than the liquid in the bottom rise upwardly and breakup into much smaller bubbles as they pass through the bores 67 of the disc 61 to thereby provide a much quieter operation than would otherwise occur.

It will be noted that the present concept will lend itself to other forms of operation whereby the insert will be appropriately molded to suffice for the need. At the same time the container may take different forms as necessary.

Of considerable advantage to the present matter is the useful function served by the wand or stem. In the first instance, it is used to support the useful portion of the insert and to maintain a preselected spaced relationship within the mold. At the conclusion of the blow molding step the remaining stem portion not severed has its end portion embedded in the bottom or wall of the container thusly blow molded to thereby provide another point of support for the insert as will be seen in both embodiments hereinbefore discussed.

What is claimed is:

1. A method for producing a blow molded thermoplastic container having an insert therein comprising:
   (a) positioning an insert having an elongated stem extending from the insert between open parts of a multipart mold having confronting cavities against which thermoplastic material is to be blown, such that a portion of said stem depends below said cavities;
   (b) providing temporary supporting means for said insert means external of said mold;
   (c) extruding heated tubular thermoplastic material between said parts of said multipart mold and around said insert in spaced relationship;
   (d) closing said mold thereby pressurizing to drive inwardly radially a portion of said tubular thermoplastic material to adhere to at least a portion of said insert, and severing the stem portion depending below said cavities;
   (e) applying pressure internally or vacuum externally of said tubular thermoplastic material to drive said tubular thermoplastic material against the cavities of said mold to form a container;
   (f) thereafter opening the mold to free the blow molded thermoplastic container.

2. The method of claim 1 wherein before the step of (f) the said thermoplastic blow molded container is charged with a liquid.

3. The method of claim 2 wherein the thermoplastic material is selected from the group consisting of polyethylene and polypropylene.

4. The method of claim 3 wherein the insert is a nozzle having an orifice containing portion and one end of the stem is attached to the orifice portion.

5. The method of claim 3 wherein the insert is fabricated of a material that becomes heat sealed to the tubular thermoplastic material when step (d) occurs.

6. The method of claim 5 wherein the insert is fabricated of a material selected from the group consisting of polyethylene and polypropylene.

7. The method of claim 1 wherein the thermoplastic material is selected from the group consisting of polyethylene and polypropylene.

8. The method of claim 7 wherein the insert is a nozzle having an orifice containing portion and one end of the stem is attached to the orifice portion.

9. The method of claim 7 wherein the insert is fabricated of a material that becomes heat sealed to the tubular thermoplastic material when step (d) occurs.

10. The method of claim 9 wherein the insert is fabricated of a material selected from the group consisting of polyethylene and polypropylene.

11. A method for producing a blow molded thermoplastic container having an insert therein comprising:
    (a) positioning an insert having an elongated stem extending from the insert between open parts of a multipart mold having confronting cavities against which thermoplastic material is to be blown, such that a portion of said stem depends below said cavities;
    (b) supporting said insert temporarily by said stem;
    (c) extruding heated tubular thermoplastic material between said parts of said multipart mold and around said insert in spaced relationship;
    (d) closing said mold thereby pressurizing to drive inwardly radially a portion of said tubular thermoplastic material to adhere to at least a portion of said insert, and severing the stem portion depending below said cavities;
    (e) applying pressure internally or vacuum externally of said tubular thermoplastic material to drive said tubular thermoplastic material against the cavities of said mold to form a container;
    (f) thereafter opening the mold to free the blow molded thermoplastic container.

12. The method of claim 11 wherein before the step of (f) the said thermoplastic blow molded container is charged with a liquid.

13. The method of claim 12 wherein the thermoplastic material is selected from the group consisting of polyethylene and polypropylene.

14. The method of claim 13 wherein the insert is a nozzle having an orifice containing portion and one end of the stem is attached to the orifice portion.

15. The method of claim 13 wherein the insert is fabricated of a material that becomes heat sealed to the tubular thermoplastic material when step (d) occurs.

16. The method of claim 15 wherein the insert is fabricated of a material selected from the group consisting of polyethylene and polypropylene.

17. The method of claim 12 wherein the thermoplastic material is selected from the group consisting of polyethylene and polypropylene.

18. The method of claim 17 wherein the insert is a nozzle having an orifice containing portion and one end of the stem is attached to the orifice portion.

19. The method of claim 17 wherein the insert is fabricated of a material that becomes heat sealed to the tubular thermoplastic material when step (d) occurs.

20. The method of claim 19 wherein the insert is fabricated of a material selected from the group consisting of polyethylene and polypropylene.

* * * * *